April 12, 1966  C. D. SIMMERS  3,245,768
ROTOR FOR FORMING GLASS FILAMENTS
Filed March 19, 1962  2 Sheets-Sheet 1

INVENTOR.
CHARLES D. SIMMERS
BY
ATTORNEY

April 12, 1966  C. D. SIMMERS  3,245,768
ROTOR FOR FORMING GLASS FILAMENTS
Filed March 19, 1962  2 Sheets-Sheet 2

INVENTOR.
CHARLES D. SIMMERS
BY John A. McKinney
ATTORNEY

United States Patent Office 3,245,768
Patented Apr. 12, 1966

3,245,768
ROTOR FOR FORMING GLASS FILAMENTS
Charles D. Simmers, Neshanic, N.J., assignor to Johns-Manville Corporation, New York, N.Y., a corporation of New York
Filed Mar. 19, 1962, Ser. No. 180,715
2 Claims. (Cl. 65—15)

This invention relates generally to the production of fibers and more particularly to the forming of glass fibers by the attenuation of centrifugally initiated filaments of molten glass. More specifically the instant invention relates to a disc or rotor for use in the centrifugal initiation of filaments of molten glass and to a method for making such disc or rotor, hereinafter referred to only as rotor.

In the so-called rotary or centrifugal process for forming glass fibers, a molten stream of glass is deposited on a rapidly rotating rotor provided at its periphery with a rim having a plurality of openings formed therein through which the molten glass issues in the form of filaments. As the filaments issue from the openings at the rotor periphery, they are subjected to the action of a high velocity, high temperature gaseous blast to attenuate the filaments into fine diameter fibers. The rotors commonly used in fiberization processes of this nature are of essentially one piece construction, sometimes cast, having a relatively thick metal section throughout to withstand the stresses of high rotational speeds and the temperatures resulting from the molten glass and from the close proximity of the high temperature attenuating blast. The usable life of such rotors is primarily limited by the amount of erosion of the walls defining the openings through which the molten glass issues as filaments. With conventional constructions for the rotor, it is necessary to scrap the entire unit when the erosion of the walls defining the openings becomes excessive and thus the life of the unit is limited by the life of the openings.

It is an object of the present invention to provide an improved rotor for use in rotary fiber forming apparatus and to a method for forming such a rotor.

A further object of the present invention is to provide a rotor construction having the parts thereof, especially the portions subjected to the greatest erosion by the glass, readily replaceable.

In accordance with the present invention, there is provided a rotor for forming and presenting glass filaments to the action of an attenuating means in which the portion of the rotor, containing the openings through which the molten glass issues as filaments, is in the form of a peripheral band which is removably mounted about the periphery of the rotor and forms a portion of the rim thereof. In some instances, such as when the molten glass is deposited on the rotor at an off center location, it is desirable to have means on the rotor to aid in the circumferential spreading of the molten glass. In one form of the invention, this circumferential spreading means comprises at least one additional band having a diameter smaller than the first mentioned peripheral band. The additional band has a plurality of openings therein and is positioned so that the molten glass deposited on the rotor is urged by the centrifugal forces generated by the rotating rotor to flow through the openings in the additional band and impinge against the first mentioned peripheral band at a location removed from the openings therein so that the impact force of the glass is directed against a portion of the peripheral band having the greater resistance against impact forces. The glass then flows along the inner peripheral surface of the peripheral band and upon reaching the portion thereof provided with the openings, flows outwardly in the form of filaments. Thus, in accordance with the method of the invention, the glass is thrown or flung outwardly to be intercepted by a portion of the peripheral band having the greater strength and then moves over the inner peripheral surface of the peripheral band to pass through the openings therein. Since the wall or annular layer of glass is thinnest at its portions which pass through the openings, the pressure on the peripheral band in that area is at a minimum.

The invention will be more fully understood and further objects and advantages thereof will become apparent when reference is made to the following detailed description of a preferred embodiment of the invention and the accompanying drawing in which.

Figure 1:
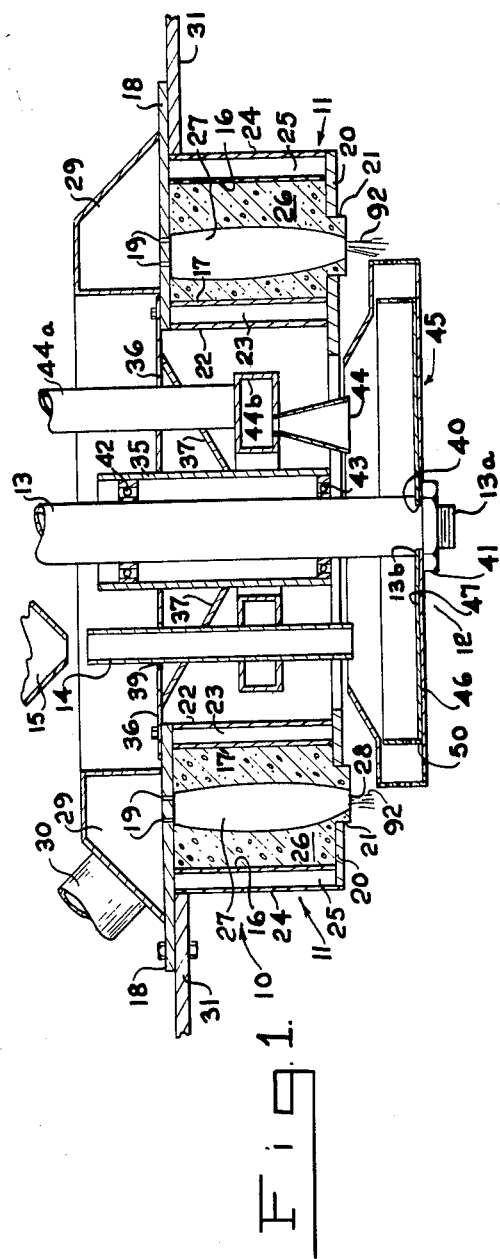
FIG. 1 is a view in cross section of an apparatus constructed for use in accordance with the instant invention.

With reference now to the drawings and particularly to FIG. 1, there is shown suitable apparatus 10 for forming glass fibers by the rotary process. The apparatus 10 comprises a combustion housing indicated generally by the numeral 11, a rotor constructed in accordance with the present invention and indicated generally by the numeral 12, support shaft 13 for carrying the rotor, and an interior column 14 through which molten glass from a supply 15 is delivered to the rotor 12.

The combustion housing 11 is of generally circular configuration and is defined by generally cylindrical exterior wall 16 and inwardly spaced wall 17. At its uppermost end, the combustion chamber is closed by a generally annular ring shaped plate 18 suitably joined to walls 16 and 17. The plate 18 is provided with a plurality of openings 19 for a purpose to be described later. A generally annular ring shaped lower plate 20 is joined to the walls 16 and 17 at their lowermost extremities and has a generally annular opening 21 formed therein. A generally cylindrical inner wall 22 cooperates with the wall 17 to form a combustion chamber water jacket 23 and the wall 22 extends between and is joined to the upper and lower plates 18 and 20. Spaced outwardly from the wall 16 is a generally cylindrical wall 24, also joined to the upper and lower plates 18 and 20, and cooperating with the wall 16 to define a water jacket 25.

Between the walls 16 and 17, there is an inner refractory member 26 of ring-shaped configuration having a combustion chamber 27 which terminates in an annular opening 28 through which, as will be later described, hot products of combustion are emitted to attenuate glass filaments, projected from the rotor 12, into fibers. A combustible mixture of gases is fed into the combustion chamber 27 through the openings 19 which lead from a gas manifold 29 secured to the plate 18. A tube 30 introduces the gases under pressure to the manifold 29. Mounting means 31 are provided for holding the apparatus in the desired position.

The rotor 12 is supported beneath the combustion chamber 11 on the shaft 13 which is mounted in a vertically extending bearing tube 35 supported by a circular plate 36 which is connected to and supported by the upper plate 18 of the combustion housing 11. Additional supporting beams 37 cooperate to hold the bearing tube in position. The plate 36 is provided with an opening 39 therein for receiving and supporting the tube 14 through which the molten glass, to be deposited on the rotor 12, is poured. At its lowermost end, the rotatable drive shaft 13 has a threaded portion 13a of reduced cross-sectional area to form a shoulder 13b. The portion 13a extends through an opening 40 provided at the rotational axis of the rotor 12 which is secured to the shaft 13 for rotation therewith by being clamped between the shoulder 13b and a suitable nut 41. The drive shaft 13 is spaced from and supported within the tube 35 by means of spaced bearings 42 and 43. The shaft 13 is driven by a suitable motor (not shown).

Figure 2:
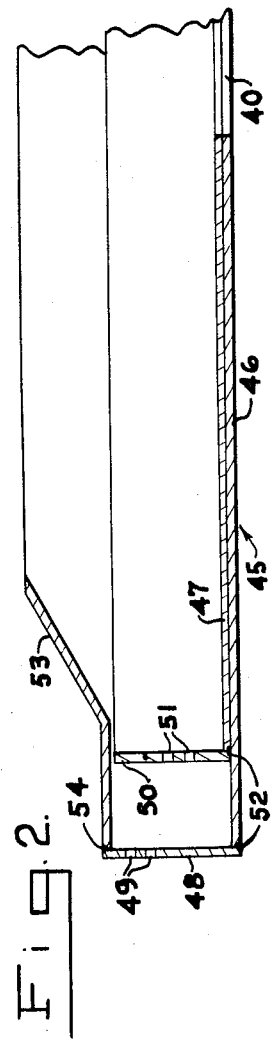
FIG. 2 is an enlarged view in cross section of a portion of the rotor of FIG. 1.

In the embodiment of the invention illustrated in FIGS. 1 and 2, the rotor 12 comprises a generally circular base 45 having a central opening 40 wherein said base 45 comprises superimposed sheets 46 and 47 of metal, each of which may be formed by a conventional sheet metal stamping operation. Sheets 46 and 47 are secured to each other by welding. The sheet 46 has an outside diameter greater than the outside diameter of the sheet 47. Secured to the sheet 46 adjacent the outer peripheral surface thereof is a peripheral band 48 having a plurality of openings 49 therein. Also, a peripheral band 50 having a plurality of openings 51 therein is secured to the sheet 47 adjacent the outer peripheral surface thereof. Each of the peripheral bands 48 and 50 may be formed from flat sheets of metal which are then rolled to the desired generally cylindrical shape that is similar to the outer peripheral surface of the circular sheets 46 and 47. Each of the peripheral bands 48 and 50 is then secured to its associated sheet 46 or 47 by welding indicated generally at 52. The openings 49 in the band 48 are offset axially and radially from the openings 51 in the peripheral band 50. A splatter and strength shield 53, comprising a sheet metal stamping is secured to the peripheral band 48 by welding indicated generally at 54. Although two bands 48 and 50 have been described in the preferred embodiment of the invention, it is to be understood that this is for illustration purposes only. If the molten glass is deposited centrally on the rotor or if other types of distributing means are utilized to effect circumferential spreading of the molten glass, the peripheral band 50 may be omitted from the rotor.

In order to maintain the desired viscosity of the molten glass after being deposited on the rotor 12, the instant invention provides suitable heating means comprising a plurality of burners 44 provided with combustibles and comburents through the tube 44a and annular housing 44b.

Figure 3:
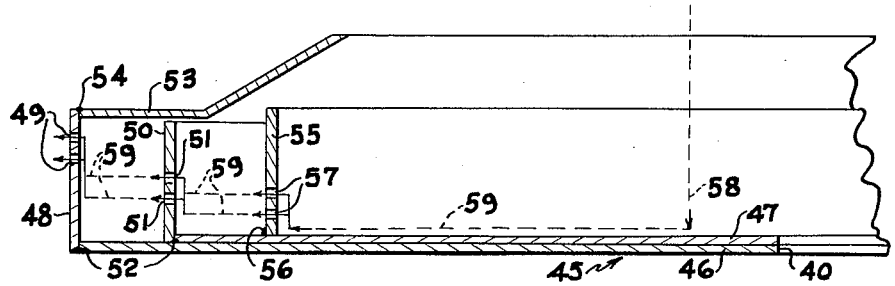
FIG. 3 is a view in cross section of a modification of the rotor for use in accordance with the instant invention.

In the embodiment of the invention illustrated in FIG. 3, a rotor 12 similar to that illustrated in FIGS. 1 and 2 is provided with another peripheral band 55 having an outside diameter smaller than the outside diameter of peripheral band 50 and the band 55 is secured to the sheet 47, in generally concentric relationship to the band 50, by welding indicated at 56. The band 55 has a plurality of openings 57 therein. As illustrated in FIG. 3, the molten glass is deposited on the base 45 as indicated by the arrow 58. The molten glass is then urged by the centrifugal forces generated by the rotation of the rotor 12 across the base 45 and through the openings 57, 51 and 49 in the bands 55, 50 and 48 as indicated by the dotted lines and arrows 59.

Figure 4:
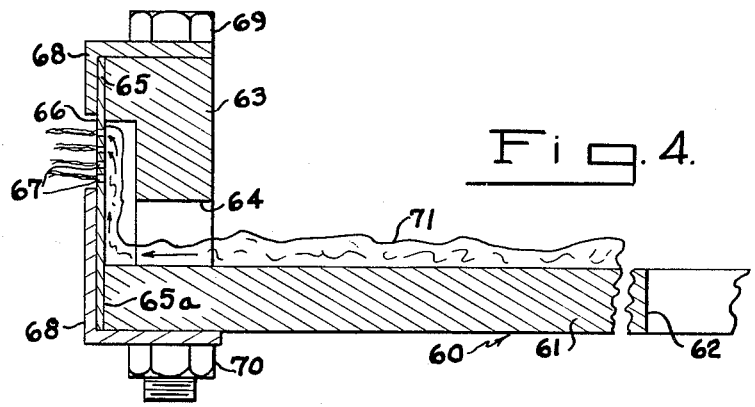
FIG. 4 is another modification of a rotor for use in accordance with the instant invention.

In FIG. 4, there is illustrated another form of rotor, made in accordance with the inventive concepts of the instant application. The rotor 60 comprises a relatively thick generally circular base 61, which may comprise a metal casting, provided with a central opening 62. Adjacent the peripheral surface thereof, the base 61 is provided with an integral upstanding rim 63 having a plurality of openings 64 therein. The base 61 and the rim 63 are provided with external periphery surfaces 65 and 65a having substantially the same outside diameter. A peripheral band 66, formed from sheet metal in the same manner as peripheral bands 48, 50 and 55, having a plurality of openings 67 therein is held in contiguous relationship with the peripheral surfaces 65 and 65a by a cooperating pair of generally circular clamping members 68 which are held in position by a plurality of bolts 69 passing through the rim 63, base 61 and clamping members 68 and secured by the nuts 70. As illustrated in FIG. 4, the molten glass 71 is deposited on the base 61 and is urged outwardly across the base by centrifugal forces generated by the rotation of the rotor 60 through the openings 64 to the peripheral band 66 and then out through the openings 67.

Figure 5:
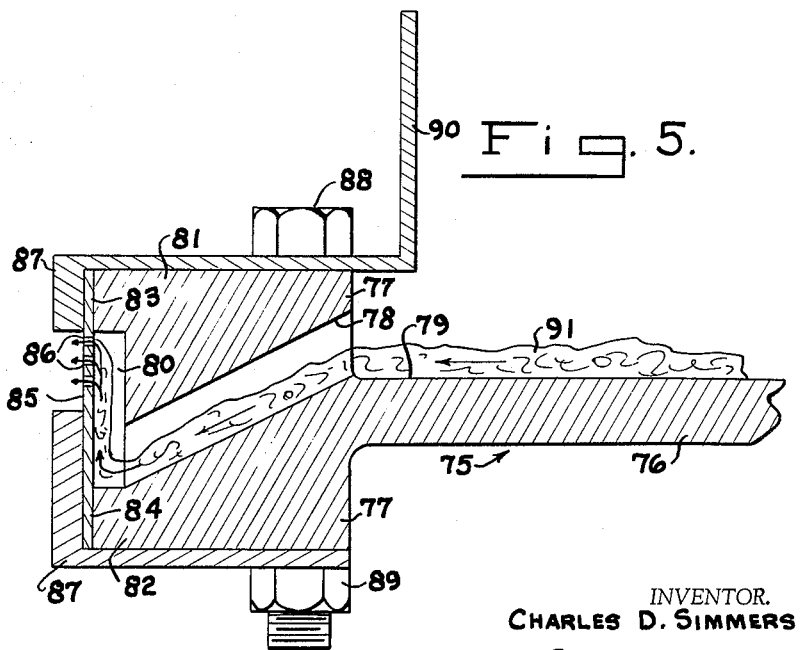
FIG. 5 is another modification of a rotor for use in accordance with the instant invention.

The rotor 75, illustrated in FIG. 5, comprises a relatively thick, generally circular base 76, which may comprise a casting, provided with a rim portion 77. A plurality of openings 78 extend through the rim portion 77 in a generally radial direction but also inclined generally axially of the rotor. The openings 78 are in communication with the upper surface 79 of the base 76 so that molten glass may flow from said surface 79 through the openings 78. The rim portion 78 has a recess 80 formed by the radial extensions 81 and 82 which are provided with peripheral surfaces 83 and 84 having substantially the same outside diameter. A peripheral band 85, similar to peripheral band 66, having a plurality of openings 86 therein is held in contiguous relationship with the peripheral surfaces 83 and 84 by a cooperating pair of generally circular clamping members 87 by a plurality of bolts 88 passing through the rim portion 77 and the clamping members 87 and secured by the nuts 89. A splash shield 90 is integral with the upper clamping members 87. As illustrated in FIG. 5, the molten glass 91 is deposited on the base 76 and is urged outwardly in a generally radial direction by the centrifugal forces generated by the rotation of the rotor 75 through the openings 78 to the lower portion of the peripheral band 85 and then out through the opening 86.

In the form of the invention illustrated in FIGS. 1-5, inclusive, the bands 48, 50, 55, 66 and 85 have been illustrated as being generally cylindrical. However, it is within the scope of this invention that the bands 48, 50, 55, 66 and 85 could be in the form of a frustum of a cone having, in the preferred embodiment, the smaller annular opening attached to the base of the rotor. In the embodiments of FIGS. 4 and 5, the peripheral surfaces 65, 65a, 83 and 84 would be shaped to conform to the conical formation of the bands.

In operation of the apparatus illustrated in FIGS. 1 and 2, molten glass from the supply 15 is fed downwardly through the column 14 onto the rotor 12 which is being rotated at a speed of about 2000 r.p.m. by appropriate means (not shown). Due to the centrifugal forces generated by the rapid rotation of the rotor 12, the glass is thrown outwardly across the face of sheet 47 against the inner wall of the band 50. After striking the lower portion of the band 50, the glass spreads laterally from the impact points and forms a thin layer adjacent the juncture of the band 50 and the sheet 47. Due to centrifugal force generated by the rotating rotor 12 and the constant supply of molten glass to the rotor 12, the glass is forced or lifted upwardly along the inner surface of the band 50 in the form of a thin upstanding annular wall or layer until it covers the area having the plurality of rows of openings 51 and is extruded therethrough. After passing through the openings 51, the glass then strikes against the solid lower portion of the peripheral band 48. Due to the centrifugal forces generated by the rotating rotor 12, the molten glass is forced or lifted upwardly along the inner surface of the band 48 until it reaches the openings 49. The molten glass then passes through the openings 49 in the form of thin semi-molten filaments which are attenuated to fine diameter fibers by the gaseous blast 92 emanating from the combustion chamber 11. Thus, the initial impact of the glass in each instance is first received by the portion of the peripheral bands 48 and 50 which have the best physical characteristics to withstand the impact forces of the glass. The rotors illustrated in FIGS. 3, 4 and 5 operate generally in the same manner as the rotor illustrated in FIG. 2. Therefore, it is considered that a detailed description of the operation of these rotors is not necessary for a full understanding of the inventive concepts of the instant application.

In view of the foregoing explanation, it is evident that the instant invention provides a distinct step forward in the art by providing a rotor, utilized for the centrifugal formation of filaments of molten glass, with a readily replaceable filament forming band. Thus, in accordance with the instant invention, when the openings in the peripheral band being utilized to form filaments of molten glass become too large, the old band may be removed and a new one secured in its position by welding or by the releasable clamping members illustrated in FIGS. 4 and 5. The peripheral bands 48, 50, 55, 66 and 85 may be formed in the most economical manner and in the preferred method are formed from sheet metal utilizing conventional sheet metal forming techniques. In the preferred embodiment of the invention, the bands are formed from a metal which has suitable characteristics to resist the corrosive action of the molten glass. One suitable metal comprises a cobalt base alloy, such as that marketed by the Haynes Stellite Company under the trade designation "Haynes Alloy No. 25," in thicknesses of between about 25 to about 125 thousandths of an inch. Another metal comprises a nickel base alloy such as that marketed by the General Electric Company under the trade designation of "G.E. Alloy Rene 41." The openings 49, 51, 57, 67 and 86 may be formed in the bands 48, 50, 55, 66 and 85 in any conventional manner. In the preferred embodiment of the invention, the openings 49, 67 and 86 are formed by a process identified by the trade designation "Elox" in which the holes are pierced by an electric spark discharge. The holes 51 and 57 are punched by conventional sheet metal techniques. The openings 49, 67 and 86 may have diameters in the range from about 22 to about 35 thousandths of an inch depending on rate of fiber formation and size of filaments. The openings 51 and 57, in the preferred embodiment, are of substantially the same diameter and preferably have diameters in the range from about 94 to about 250 thousandths of an inch. However, it is to be understood that the foregoing examples are given for purposes of illustration only and it is not intended to limit the invention in any manner.

In the embodiments of the invention illustrated in FIGS. 1, 2 and 3, the openings in the peripheral bands 48, 50 and 55 are offset radially and axially from each other and also the openings in the innermost band are spaced a finite distance from the sheet 47. Therefore, the molten glass must move along the inner surface of the peripheral bands in an axial direction to pass through the openings in each band. Such displacement, under the influence of the radial and centrifugal forces present during the rotation of the rotors, causes a circumferential spread of the molten glass around the inner surface of each band. This circumferential spread of the molten glass insures a uniform film of the molten glass behind the filament forming openings in the outermost peripheral band so that glass fibers having substantially uniform diameter may be readily formed. Also, it is noted that although the diameter of the openings in the outer peripheral band may be smaller than the diameter of the openings in the inner peripheral band or bands, there are more openings in the outer peripheral band so that the total area of the space vacated by the openings of each band is substantially equal. The number of peripheral bands utilized varies in relation to the rate of fiber formation desired and the need for additional circumferential spreading of the molten glass. Also, although the illustrations in FIGS. 2 and 3 disclose rotors having only two and three peripheral bands, it is to be understood that a higher number of peripheral bands may be utilized.

In FIGS. 3 and 4, the openings 64 and 78 in the rims 63 and 77 are spaced apart to allow for a circumferential spreading of the molten glass about the peripheral surface of the rims. Also, openings 64 and 78 are so arranged that the molten glass strikes the peripheral bands 66 and 85 a finite distance from the openings 67 and 86 therein so that the molten glass must move along the inner surface of the peripheral band in an axial direction to pass through the openings 67 and 86. As stated above, such displacement, under the influence of the radial centrifugal forces present during the rotation of the rotors 60 and 75, causes a circumferential spreading of the glass around the inner surface of the bands 66 and 85.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A rotor, for use in rotary systems of glass fiberization wherein a supply of molten glass is deposited on the base of a rotor and urged by centrifugal force through openings in a peripheral member of the rotor to produce filaments of molten glass to be attenuated into fibers, comprising:
    (a) a base comprising a sheet of metal having at least one broad surface area for receiving a supply of molten glass,
    (b) means for rotating said base about an axis extending generally perpendicular to said broad surface area,
    (c) means connecting said base to said rotation means,
    (d) a first annular member comprising a sheet of metal in annular form secured to said base,
    (e) said first annular member having a plurality of openings therein,
    (f) a second annular member comprising a sheet of metal in annular form having a maximum diameter smaller than the minimum diameter of said first annular member secured to said base,
    (g) said second annular member having a plurality of openings therein,
    (h) said openings in said second annular member being nearer to said base than said openings in said first annular member,
    (i) said openings in said first annular member being offset radially and axially from the openings in said second annular member, and
    (j) means for depositing a supply of molten glass onto said broad surface area of said base and within the area defined by said second annular member to be urged by centrifugal force out through the openings in said second and said first annular members.

2. Apparatus as defined in claim 1 wherein:
    (a) the total area vacated by said plurality of openings in said first annular member being substantially equal to the total area vacated by said plurality of openings in said second annular member.

References Cited by the Examiner

UNITED STATES PATENTS

| | | | |
|---|---|---|---|
| 2,151,568 | 3/1939 | Sinclair | 29—475 |
| 2,900,713 | 8/1959 | Young | 29—475 |
| 2,931,062 | 4/1960 | Leaman | 65—374 |
| 2,984,864 | 5/1961 | Levecque et al. | 65—8 |
| 2,994,918 | 8/1961 | Landers | 18—43 X |
| 3,007,196 | 11/1961 | Levecque et al. | 65—15 |
| 3,014,236 | 12/1961 | Snow | 65—14 |
| 3,020,586 | 2/1962 | Charpentier et al. | 65—14 |
| 3,054,140 | 9/1962 | Firnhaber | 65—14 X |

DONALL H. SYLVESTER, *Primary Examiner.*

MICHAEL V. BRINDISI, *Examiner.*